Sept. 25, 1956  K. J. SYLVEST  2,764,316
APPARATUS FOR CONVEYING PULVERULENT MATERIAL
Filed Oct. 2, 1952  2 Sheets-Sheet 1
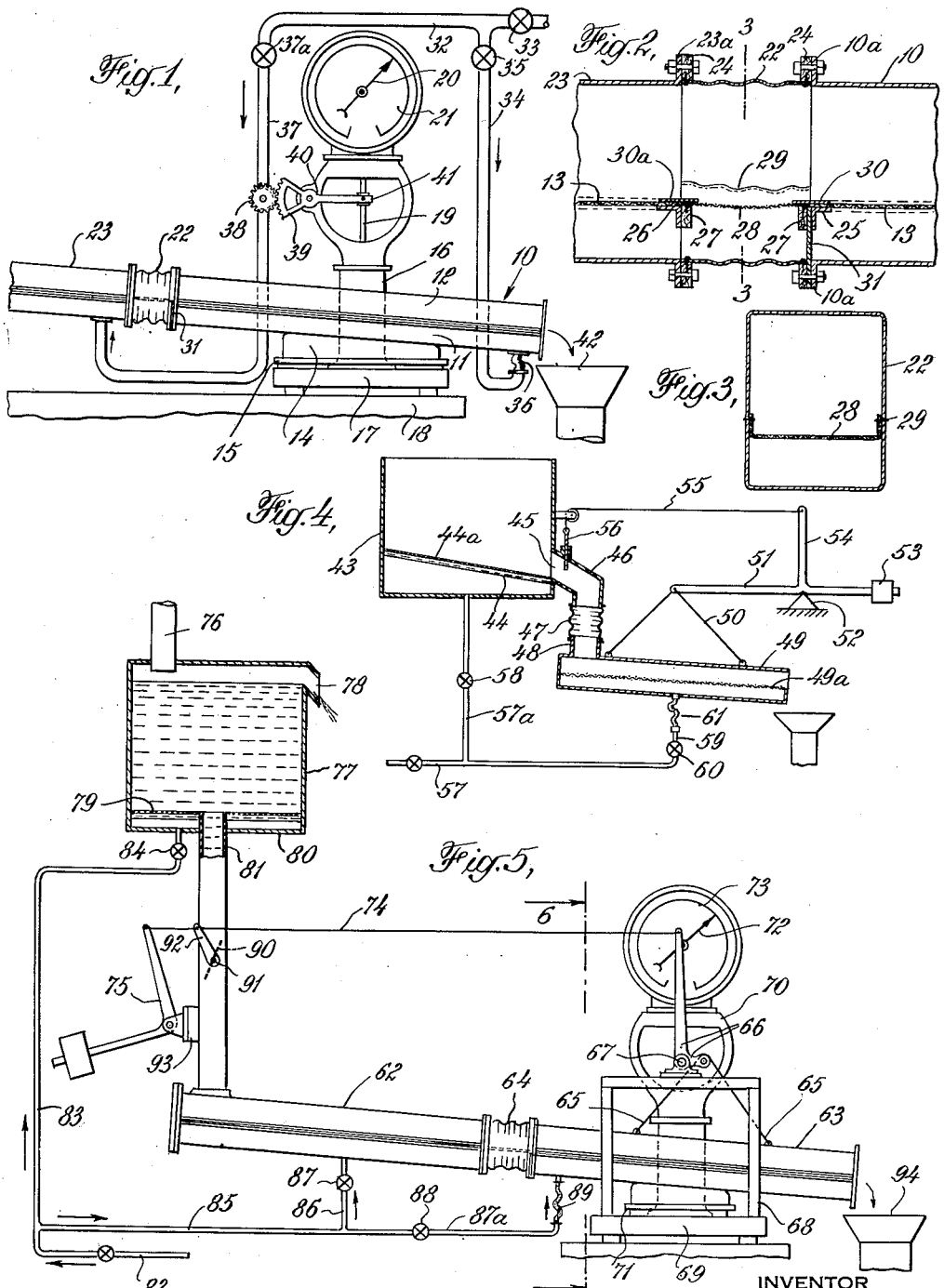
INVENTOR
Karl Jens Sylvest
BY
Pennie Edmonds Morton Barrows Taylor
ATTORNEYS

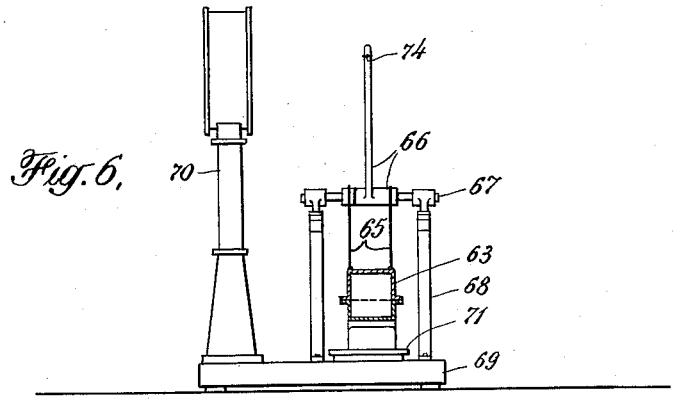
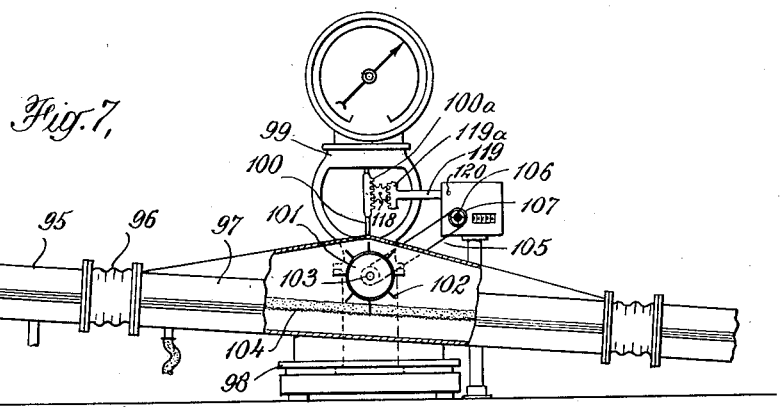
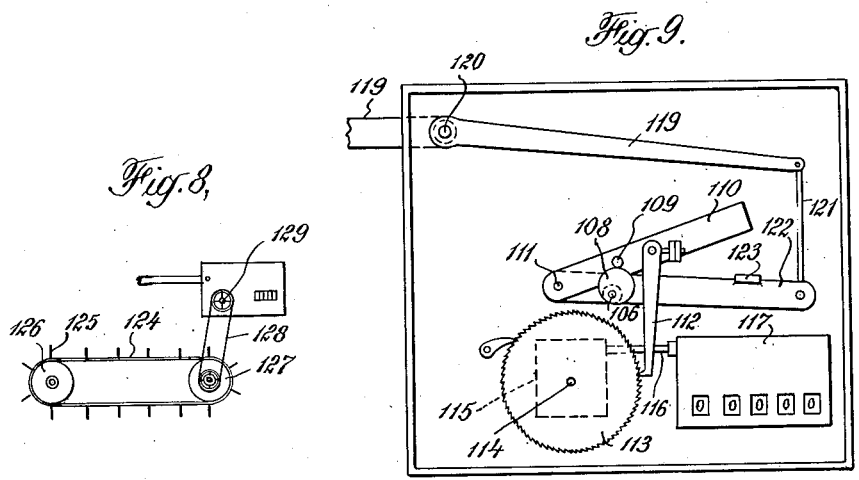

United States Patent Office

2,764,316
Patented Sept. 25, 1956

2,764,316

APPARATUS FOR CONVEYING PULVERULENT MATERIAL

Karl Jens Sylvest, Copenhagen, Denmark, assignor to F. L. Smidth & Co., New York, N. Y., a corporation of New Jersey Application October 2, 1952, Serial No. 312,842

9 Claims. (Cl. 222—55)

This invention relates to apparatus for conveying pulverulent material and is concerned more particularly with a novel conveying system, which is provided with means for continuously weighing the material being conveyed. In the new system, the variations in weight of the material passing through the system may be utilized to control the conveying operation to the end that a constant weight of material will be conveyed per unit of time, or the system may be equipped with an integrating meter operating in response to variations in the weight of the material being conveyed and to the velocity of the material to indicate the total weight of material passed through the system in any selected time interval.

The new system makes use of pneumatic channels, one of which is stationary while another is suspended for vertical movement. The term "pneumatic channel," as used herein, refers to a trough mounted at an inclination and containing a partition disposed above its bottom and formed of a material porous to air but impermeable to the material being conveyed. Air under pressure is admitted to the channel beneath the partition and the air escaping through the partition enters the material on the partition and renders the material fluent, so that it will move along the surface of the partition like a liquid to the lower end of the channel.

In the apparatus of the invention, the main pneumatic channel of the system is fixed in position and the second channel is suspended for vertical movement without change in its inclination. The suspended channel is counterbalanced, and the variations in the load of material therein cause the channel to rise and fall. The main and suspended channels are connected end to end by flexible means, such as a leather sleeve, and air for conveying is supplied to the two channels. In some instances, the flexible connecting means may include a porous partition and the space within the connecting means below the partition may be closed at one end, in which event one air supply means furnishes air for conveying to one channel and the connecting means, and the other furnishes air for conveying to the other channel.

When the apparatus is to be employed as a feeding device delivering a predetermined weight of material per unit of time, the vertical movements of the suspended channel resulting from variations in the weight of the material therein may be used to control the rate of travel of the material through the system. For this purpose, the vertical movements of the channel may be employed to operate a valve controlling the supply of conveying air to the stationary main channel in such manner that, as the load in the suspended channel increases, the supply of air to the main channel is reduced and vice versa. A reduction in the supply of conveying air to the main channel reduces the fluidity of the material in that channel and, thus, reduces the rate, at which the material enters the suspended channel. As a result, the rate of flow from the suspended channel is greater than the rate at which material enters the channel, and the weight of material in the channel decreases. The opposite effect occurs, when the supply of conveying air to the main channel is increased.

In another embodiment of the invention, the rate of flow of the material through the suspended channel is controlled by means of a damper operated by the vertical movements of the channel. The damper may be installed at any convenient location, as, for example, it may be disposed between the main and suspended channels or in the line, through which the material enters the main channel.

When the system is provided with an integrating meter having a shaft rotated at a rate corresponding to the velocity of the material through the suspended channel and means responding to changes in the weight of the material in the suspended channel, an endless member, such as a wheel or a belt, which is provided with vanes, is mounted in the suspended channel with its vanes entering the material and is operatively connected to the shaft. The vertical movements of the suspended channel are then transmitted in any suitable way to the means in the meter responsive to changes in the weight of the material.

For a better understanding of the invention, reference may be had to the accompanying drawings, in which Fig. 1 is a view in front elevation of a portion of one form of a conveying system embodying the invention;

Fig. 2 is a vertical, longitudinal, sectional view through the connection between the stationary and suspended channels of the apparatus of Fig. 1;

Fig. 3 is a sectional view on the line 3—3 of Fig. 2;

Fig. 4 is a view partly in vertical section and partly in elevation of another form of the apparatus;

Fig. 5 is a view partly in vertical section and partly in elevation showing a modified form of the apparatus;

Fig. 6 is a sectional view on the line 6—6 of Fig. 5;

Fig. 7 is a front elevational view with parts broken away of a form of the apparatus, with which an integrating meter is employed;

Fig. 8 is a fragmentary view in front elevation of features, which may be employed in the apparatus of Fig. 7; and Fig. 9 is a front elevational view of the operating mechanism of an integrating meter, which may be employed with the apparatus.

The apparatus shown in Fig. 1 comprises a pneumatic channel 10, which is of the covered type and includes a trough 11 having lateral flanges connected to those of an inverted trough 12, which serves as a cover. A partition 13 extends across the trough and is made of a material, which may be penetrated by air but is impermeable to the pulverulent material being conveyed. The channel 10 is mounted in inclined position on a support 14 resting on the platform 15 of a scale 16, the base 17 of which rests upon a foundation 18. The scale is of conventional construction and, in addition to the platform, includes a vertical rod 19 and a pointer 20 operated by the rod and movable over a scale 21 to indicate the momentary load on the platform.

The high or intake end of the suspended channel 10 is connected by a flexible sleeve 22 to the low or discharge end of a rigidly mounted pneumatic channel 23. The adjacent ends of the channels are provided with circumferential flanges 10a and 23a, respectively, and the flexible sleeve 22, which is made of impermeable material, such as soft leather, has its end edges clamped against the respecific flanges by means of wooden frames 24 bolted to the flanges. An angle iron 25 extends across the high end of channel 10 at the level of the partition 13 therein and a similar angle iron 26 extends across the low end of channel 23 at the level of the partition 13. Each frame 24 has a cross-bar 27 at the level of the adjacent angle iron and a porous diaphragm 28 is connected to the cross-bars by being glued and nailed thereto, and the ends of the diaphragm are then secured to the walls of the sleeve by stitching along seams 29. The diaphragm 28 thus lies in the level of the porous partitions 13 in the channels. Fabric patches 30, 30a are affixed to overlie the adjacent transverse edges of diaphragm 28 and the partitions 13. A solid plate 31 lies between flange 10a at the bottom of the upper end of channel 10 and the adjacent member of frame 24 and the plate extends up to lie between the crossbar 27 on the frame and one flange of angle iron 25. The plate thus separates the air space in channel 10 beneath partition 13 from the air space in sleeve 22 below diaphragm 28. The space beneath the diaphragm is open to the space beneath the partition 13 in channel 23.

Air for conveying is supplied through a main line 32 containing a valve 33 to a branch line 34 containing a valve 35 and connected through a flexible connection 36 to an inlet through the bottom of channel 10 below the partition 13 therein. Another branch line 37 containing a valve 37a leads from the main line 32 to an inlet in channel 23 below the partition. The branch line 37 contains another valve, the stem of which is provided with a pinion 38 meshing with the teeth of a gear segment 39 mounted on a lever 40 pivoted on the frame of the scale and having an arm 41 secured to the rod 19.

In the operation of the apparatus shown in Fig. 1, material entering the high end of the stationary channel 23 is rendered fluent by the air diffused into the material through the partition 13 within the channel and the material flows down through the channel and through the flexible sleeve 22 on the porous membrane 28 therein. The air entering the material through the membrane maintains the fluidity of the material as it travels through the sleeve. The material continues through the suspended channel 10, flowing downward along the porous partition 13 therein. The scale mechanism is counterbalanced, so that the pointer 20 gives a zero indication, when the channel 10 is empty, and, when the material is flowing through the channel, the channel moves down under the weight of the material and the pointer 20 gives a continuous indication of the weight of the material. The valve 38 is initially set to supply such a quantity of air for conveying to channel 23, that the material will flow from that channel into channel 10 at a selected rate. If the load of material in channel 10 increases, the corresponding movement of rod 19 of the scale will rock the lever 40 carrying the gear segment 39 and turn the pinion 38 to decrease the air supply. The material in the stationary channel 23 will, accordingly, become less fluent and the quantity of material fed therefrom into channel 10 per unit of time will be reduced, so that the desired equilibrium condition will be restored. If the load in channel 10 decreases, the corresponding movement of rod 19 will result in pinion 38 being turned to increase the air supply to channel 23, so that the material therein will become more fluent and will be supplied more rapidly to channel 10. The amount of material by weight, which is discharged per unit of time from channel 10 into the discharge hopper 42 at the lower end of the channel, will, accordingly, be kept constant.

The apparatus shown in Fig. 4 is employed for the purpose of discharging material from a silo 43 and the stationary pneumatic channel 44, which includes a porous partition 44a, is disposed within the bottom of the silo at an angle to the vertical and leads to an outlet 45, from which extends an elbow 46. The lower end of elbow 46 is connected by a flexible sleeve 47 to an inlet 48 leading to the top of a pneumatic channel 49, which is similar in construction to channel 10. Channel 49 may be suspended by being mounted on a scale, as in the construction shown in Fig. 1, but a simplified suspension system is illustrated. The channel is shown as being connected by cables 50 to one end of a lever 51 resting upon a knife edge 52, the weight of the channel being counterbalanced by a weight 53 on the lever. The lever has a side arm 54 connected by a cable 55 to a damper 56, which extends through an opening in the top of the elbow close to the outlet 45 from the silo.

Air for conveying is supplied from a main line 57 through a branch connection 57a containing a valve 58 to the bottom of the silo below the partition 44a, which may be made up of a number of sections separated by solid plates. Another branch line 59 containing a valve 60 is connected through a flexible connection 61 to an inlet into the bottom of channel 49 below the porous partition 49a therein.

In the operation of the apparatus shown in Fig. 4, the material in contact with the porous partition 44a in the bottom of the silo is fluidized and flows through the elbow 46, flexible sleeve 47, and inlet 48 into the suspended channel 49, where its fluidity is maintained by air passing into it through the porous partition 49a. The damper 56 is initially set for the desired rate of flow per unit of time through the suspended channel 49. If the weight of the material in channel 49 increases, lever 51 is rocked counterclockwise and damper 56 then moves downwardly by gravity to decrease the flow through elbow 46. If the weight of material in channel 49 decreases, the channel is raised by counterweight 53 and the damper 56 is also raised to permit increased flow from the silo through elbow 46.

The apparatus shown in Fig. 5 comprises a stationary pneumatic channel 62 and a suspended pneumatic channel 63 connected by a flexible sleeve 64, the channels and sleeve being similar to those employed in the apparatus of Fig. 1. The channel 63 is suspended by cables 65 from the short arm of a lever 66 pivoted at 67 on a frame 68 resting on the base 69 of a scale 70 outside the platform 71 thereof. The channel 63 is also mounted on the scale platform, which is connected in the usual way to a pointer 72 traveling over a dial 73. The long arm of the lever 66 is connected by a cable 74 to one arm of a counterweighted bell crank lever 75.

The material to be conveyed is supplied through a pipe 76 to a vessel 77 having an overflow opening 78, so that the level of the material therein is maintained constant. The vessel is provided with a porous partition 79 lying spaced from its bottom 80 and an outlet pipe 81 leads from an opening through the porous partition and through the bottom to an inlet into the top of the stationary channel 62 near its upper end. Air for conveying is supplied from a main line 82 through a branch 83 containing valve 84 to the interior of the vessel between its bottom and the porous partition. Air is supplied through a branch line 85 through a sub-branch 86 containing a valve 87 to the bottom of channel 62. Air is supplied from branch 85 through a sub-branch 87a containing a valve 88 and a flexible connection 89 to an inlet into channel 63. The pipe 81 leading from the vessel into the stationary channel 62 contains a damper 90 pivoted at 91 and having an arm 92 connected to cable 74. The bell crank 75 may be mounted for rocking movement on a block 93 attached to pipe 81 adjacent the damper.

In the operation of the apparatus shown in Fig. 5, the material from the vessel 77 is supplied under a constant head to the stationary channel 62 and travels through the flexible sleeve 64 to channel 63, from which it is discharged into a hopper 94. The channel 63 is suspended in part by the scale mechanism and in part by the counterweighted lever 75, and the initial setting of the apparatus is such that material flows at the desired rate through channel 63 into hopper 94. If the weight of the material in channel 63 increases, the channel moves down and this results in the swinging of levers 66 and 75 and a rocking of damper 90 to cut down the rate of flow of material from vessel 77 into the stationary channel 62. If the charge of material in channel 63 decreases in weight, the damper 90 is rocked to increase the flow through pipe 81.

The apparatus shown in Fig. 7 operates as an output meter and it includes a stationary channel 95 similar to channel 23 and connected by a flexible sleeve 96 to a suspended channel 97. Channel 97 is mounted on the platform 98 of a scale 99 having a vertical rod 100, by which the pointer of the scale is movable. The top of channel 97 is enlarged to provide space for a wheel 101 having radial vanes 102 and mounted on a shaft 103 in bearings in the walls of the top of the channel. The wheel 101 is mounted in such relation to the porous partition 104 within channel 97 that the vanes 102 on the wheel enter the material and are moved therewith, so that the wheel rotates at a rate corresponding to the velocity of flow of the material through the channel.

The shaft 103 rotated by the wheel is connected by a belt 105 to a rotating part of an integrating meter of a well known construction. The meter includes a shaft 106 carrying a pulley 107 driven by belt 105 and the shaft 106 carries an eccentric 108 engaging a projection 109 on an arm 110 freely movable on a fixed pivot 111. Arm 110 carries a weighted pawl 112, which engages a ratchet wheel 113 on a shaft 114, which is the input shaft of a gear box 115. The output shaft 116 of the gear box actuates a counting mechanism 117.

The rod 100 of the scale carries a rack 100a engaging a pinion 118 mounted for rotation on a fixed axis and the pinion meshes with a gear segment 119a on a lever 119 pivoted at 120 within the casing of the meter. The opposite end of lever 119 is connected by a link 121 to an arm 122 mounted to swing on pivot 111 and provided with a projection 123 engageable with arm 110.

In the operation of the apparatus shown in Fig. 7, material flows from the stationary pneumatic channel 95 through sleeve 96 and the suspended channel 97, and the material causes the vaned wheel 101 and shaft 106 to rotate at a rate corresponding to the velocity of the material. Rotation of the eccentric 108 on shaft 106 causes arm 110 to rise and fall. In the downward movement of the arm 110, pawl 112 advances the ratchet wheel 113 a number of teeth, which is determined by the position of arm 122. As the weight of material in the suspended channel 97 varies, rod 100 moves up or down and acts through pinion 118 to rock lever 119. If the weight of the material in the suspended channel increases, lever 119 is swung clockwise and correspondingly rocks arm 122. The projection 123 on the lever then permits an increased downward movement of lever 110 and pawl 112. As a result, ratchet wheel 113 is advanced stepwise at an increased rate. As the rotation of wheel 101 varies with the velocity of movement of the material through channel 97 and the position of lever 119 varies with the momentary weight of the material in the channel, the meter expresses the product of the weight of material within the stationary channel multiplied by its velocity.

Instead of utilizing the vaned wheel 101, the velocity of the material traveling through the suspended channel 97 may be transmitted to the integrating meter by means of a belt 124 provided with vanes 125 and trained about fixed pulleys 126, 127 mounted on shafts carried by the walls of the top of channel 97. The shaft of pulley 127 is provided with a pulley connected by a belt 128 to a pulley on a shaft 129 in the meter, which corresponds in function to shaft 106.

In the form of the new apparatus shown in Figs. 1-3, incl., the flow of material from the stationary pneumatic channel 23 into the suspended pneumatic channel 10 is controlled by varying the quantity of air supplied to channel 23 inversely with variations in the load of material in channel 10. In such an apparatus, it is necessary that the supplies of air to the stationary and suspended channels be independently controllable and that the space beneath the porous partition in the connecting sleeve 22 be blocked off from the space beneath the porous partition in one or the other of the channels. In the other forms of apparatus as shown in Figs. 4-9, incl., it is not important that the air supply to the stationary and suspended channels be independently controllable, although such an arrangement may be used, if desired.

I claim:

1. In a conveying system for pulverulent material, the combination of a main stationary inclined pneumatic channel, a second pneumatic channel of the same inclination as the main channel, means including a flexible sleeve for connecting the low end of the main channel to the high end of the second channel, means for supporting the second channel for vertical movement, means for counterbalancing the weight of the second channel, means for supplying air for conveying to the two channels, means for supplying material to the main channel, and means actuated by the vertical movements of the second channel for regulating the rate, at which material enters the second channel from the main channel.

2. In a conveying system for pulverulent material, the combination of a main stationary inclined pneumatic channel, a second pneumatic channel of the same inclination as the main channel, means including a flexible sleeve for connecting the low end of the main channel to the high end of the second channel and with the second channel extending as a prolongation of the main channel, the sleeve having a porous false bottom, on which the material being conveyed travels from the main channel to the second channel, means for supporting the second channel for vertical movement, means for counterbalancing the weight of the second channel, means for supplying air for conveying to one of the channels and to the sleeve beneath the false bottom therein, separate means for supplying air for conveying to the other channel, and means actuated by the movements of the second channel for regulating the rate, at which material enters said channel from the main channel.

3. In a conveying system for pulverulent material, the combination of a main stationary inclined pneumatic channel, a second inclined pneumatic channel, flexible means for connecting the discharge end of the main channel to the intake end of the second channel, means for supporting the second channel for vertical movement, means for counterbalancing the weight of the second channel, independently controllable means for supplying air for conveying to the two channels, and means operated by the vertical movements of the second channel for varying the supply of air for conveying to the main channel inversely with variations in the weight of the material in the second channel.

4. In a conveying system for pulverulent material, the combination of a main stationary inclined pneumatic channel, a second inclined pneumatic channel, flexible means for connecting the discharge end of the main channel to the intake end of the second channel, means for supporting the second channel for vertical movement, means for counterbalancing the weight of the second channel, separate air lines for supplying air for conveying to the two channels, a valve in the air line leading to the main channel, and means actuated by the vertical movements of the second channel for operating the valve to vary the supply of air to the main channel inversely with variations in the weight of the material in the second channel.

5. In a conveying system for pulverulent material, the combination of a main stationary inclined pneumatic channel, a second inclined pneumatic channel, means including a flexible sleeve for connecting the discharge end of the main channel to the intake end of the second channel, means for supporting the second channel for vertical movement, means for counterbalancing the weight of the second channel, means for supplying air for conveying to the two channels, and damper means operated by the vertical movements of the second channel for varying the rate of flow of material from the main channel to the second channel inversely with variations in the weight of the material therein.

6. In a conveying system for pulverulent material, the combination of a main stationary inclined pneumatic channel, a second inclined pneumatic channel, means including a flexible sleeve for connecting the discharge end of the main channel to the intake end of the second channel, means for supporting the second channel for vertical movement, means for counterbalancing the weight of the second channel, means for supplying air for conveying to the two channels, a damper for controlling flow of material from the main channel to the second channel, and means actuated by the vertical movements of the second channel for operating the damper to vary the rate of flow of the material to the second channel inversely with variations in the weight of the material in the second channel.

7. In a conveying system for pulverulent material, the combination of a main stationary inclined pneumatic channel, a second inclined pneumatic channel, means including a flexible sleeve for connecting the low end of the main channel to the high end of the second channel, means for supporting the second channel for vertical movement, means for counterbalancing the weight of the second channel, means for supplying air for conveying to the two channels, a vessel for holding a supply of the material under the constant head, a connection from the vessel to the main channel, and damper means in the connection and actuated by the vertical movements of the second channel for varying the flow of material through the main channel inversely with variations in the weight of the material in the second channel.

8. In a conveying system for pulverulent material, the combination of a main stationary inclined pneumatic channel, a second inclined pneumatic channel, means including a flexible sleeve for connecting the discharge end of the main channel to the intake end of the second channel, means for supporting the second channel for vertical movement, means for counterbalancing the weight of the second channel, means for supplying air for conveying to the two channels, means including a container for supplying material to the stationary channel, and damper means operated by the vertical movements of the second channel for varying the flow of material from the container to the main channel inversely with variations in the weight of the material in the second channel.

9. In a conveying system for puverulent material, the combination of a stationary feeding device, an inclined pneumatic channel, means for supporting the said channel for vertical movement, means for connecting the discharge end of the feeding device to the intake end of the channel, said connecting means permitting said vertical movement of the said channel, means for supplying material to the stationary feeding device, and means actuated by the vertical movements of the channel for regulating the rate at which material enters said channel from the stationary feeding device.

References Cited in the file of this patent

UNITED STATES PATENTS

| | | |
|---|---|---|
| 1,459,968 | Bailly | June 26, 1923 |
| 1,616,547 | Pontoppidan | Feb. 8, 1927 |
| 1,777,670 | Hansman | Oct. 7, 1930 |
| 1,875,485 | Okada | Sept. 6, 1932 |
| 2,288,099 | Mason | June 30, 1942 |
| 2,527,488 | Schemm | Oct. 24, 1950 |

FOREIGN PATENTS

| | | |
|---|---|---|
| 1,010,746 | France | June 16, 1952 |